Nov. 19, 1935. L. L. SCHAUER 2,021,388
HYDRAULIC ARM TRANSLATING MEANS FOR RADIAL DRILLS
Filed July 26, 1932 6 Sheets-Sheet 1

Fig. 1.

Inventor
Lawrence Lee Schauer
By Attorneys
Nathan, Bowman & Helferich

Nov. 19, 1935.    L. L. SCHAUER    2,021,388
HYDRAULIC ARM TRANSLATING MEANS FOR RADIAL DRILLS
Filed July 26, 1932    6 Sheets-Sheet 2

Inventor
Lawrence Lee Schauer
By Attorneys
Nathan, Bowman & Helferich

Nov. 19, 1935.  L. L. SCHAUER  2,021,388
HYDRAULIC ARM TRANSLATING MEANS FOR RADIAL DRILLS
Filed July 26, 1932  6 Sheets-Sheet 4

Inventor
Lawrence Lee Schauer
By Attorneys
Nathan, Bowman & Helferich

UNITED STATES PATENT OFFICE 2,021,388

HYDRAULIC ARM TRANSLATING MEANS FOR RADIAL DRILLS

Lawrence Lee Schauer, Cincinnati, Ohio, assignor to The Cincinnati Bickford Tool Company, Cincinnati, Ohio, a corporation of Ohio Application July 26, 1932, Serial No. 624,702

11 Claims. (Cl. 77—28)

This invention relates to radial drilling machines and more particularly to hydraulic means for translating the radial arm vertically on the column and for locking the arm in its various positions of adjustment.

Heretofore radial drill arms have been translated on their supporting columns by means of a relatively rotatable screw and nut, one of which has been rotated by power. In order to give the rotatable element both forward and reverse rotations, thereby to elevate or depress the arm, it has been customary to provide either reversing gears or reversing clutches, with the necessary means for selectively actuating them, to produce the desired translation of the arm.

These prior constructions have been costly to manufacture, noisy in operation, and have been subject to wear which has frequently necessitated replacement of parts thereby temporarily putting the machine out of commission and adding to the cost of maintenance.

In some instances wear on the threads in the nut has, due to the enormous weight of the arm, caused those threads to be stripped, with the result that the arm has crashed down, thereby endangering the life of the operator and causing destruction of the tool or workpiece. In an endeavor to obviate this hazard many safety devices have been provided, each of which has, however, required the provision of additional parts and has, therefore, increased the cost of the machine.

This invention has for an object to provide a translating means for radial drill arms which is materially simpler in construction and, therefore, less costly to manufacture than those heretofore provided; which is entirely noiseless in its operation; and which is not subject to instantaneous failure such as in prior constructions has resulted in the crashing down of the arm.

This object has been attained by the provision of an hydraulic motor comprising a cylinder and piston arranged parallel with the column and having one of its elements connected with the column and the other connected with the arm. A fluid pressure system, carried wholly by the arm, is provided for affording the necessary force for translating the arm.

Another object of the invention is to combine with an hydraulic arm translator an hydraulic lock adapted to support the arm after its translatory movement.

Still another object is to provide, in combination with hydraulic arm translating means, an hydraulically actuated arm clamping means actuated simultaneously with the stopping of the arm securely to clamp the arm to the column in its various positions of adjustment, and which will be released before actuating fluid may again be transmitted to the arm translating motor.

This has been accomplished by providing an hydraulically actuated arm clamp and so interconnecting and hydraulically interlocking the translating motor with the clamp actuating motor that the desired sequence of operation is obtained.

Still another object is to provide simplified means, readily available to the operator when in his normal working position, for controlling both the translating and clamping motors.

This object has been attained by providing, in the arm and adjacent the column, a valve mechanism adapted to control the flow of fluid to and from both of said motors and providing a single manually actuable control lever carried by the tool head and operatively connected with said valve means for actuating the latter. This control lever is adapted to be moved to any one of three positions, one, an intermediate position, in which it so positions the valve means that both the intake and exhaust lines of the arm translating motor are closed and, therefore, the arm is hydraulically locked against movement in either direction. This position of the actuating lever also causes the hydraulically actuated arm clamp to be set. An upper position of the control lever causes the arm clamp to be released and the arm to be moved upwardly. When the control lever is moved to its lower position it causes the arm to be unclamped and moved downwardly. Spring means acting on the control lever automatically causes it to be returned to its intermediate position whenever the operator ceases to hold it in one of its other positions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
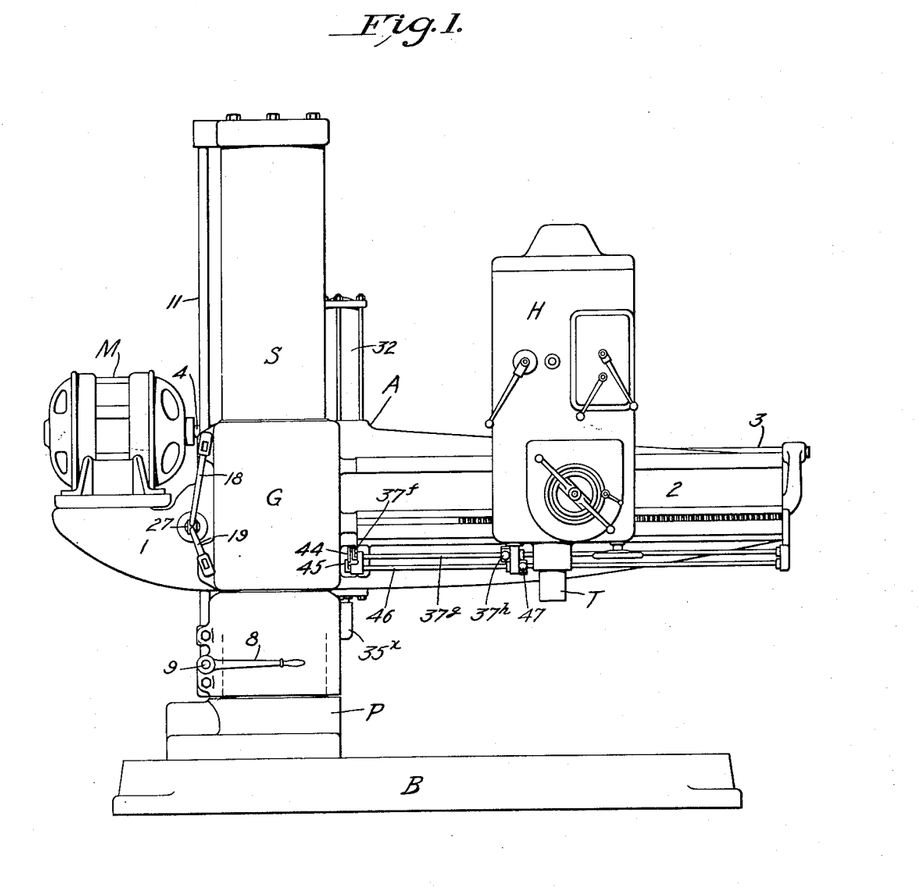
Figure 1 is a front elevation of a radial drill embodying the present invention.
Figure 2:
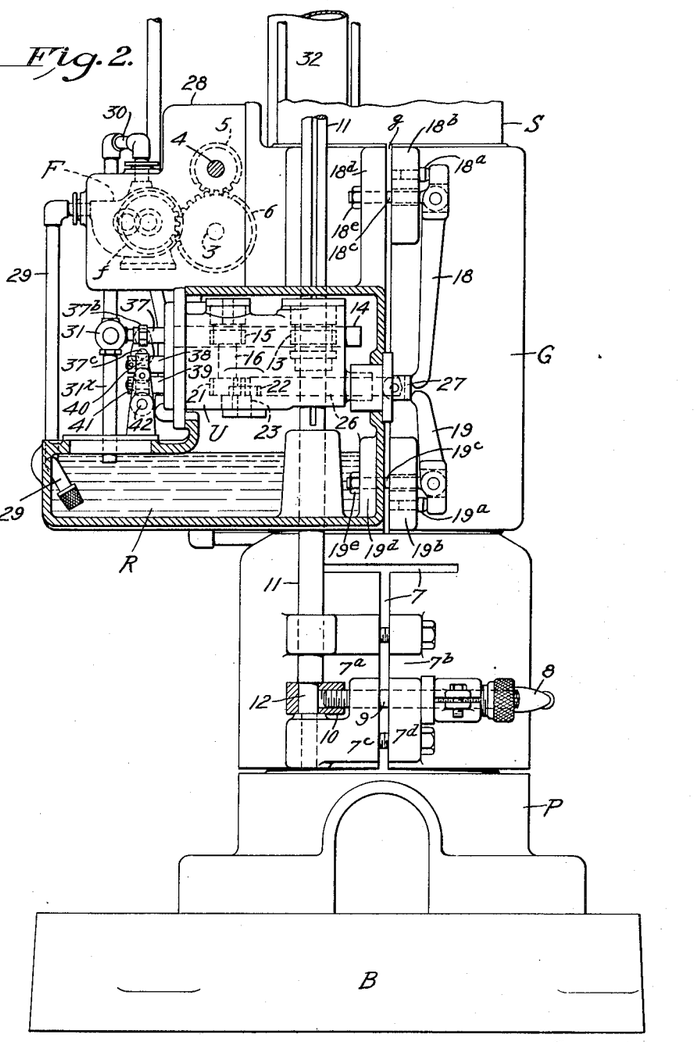
Fig. 2 is an enlarged left end view of the lower portion of Fig. 1 with the rearwardly projecting portion of the arm in section, better to show the hydraulic unit embodied therein and the connection from said unit to the arm clamping means.
Figure 3:
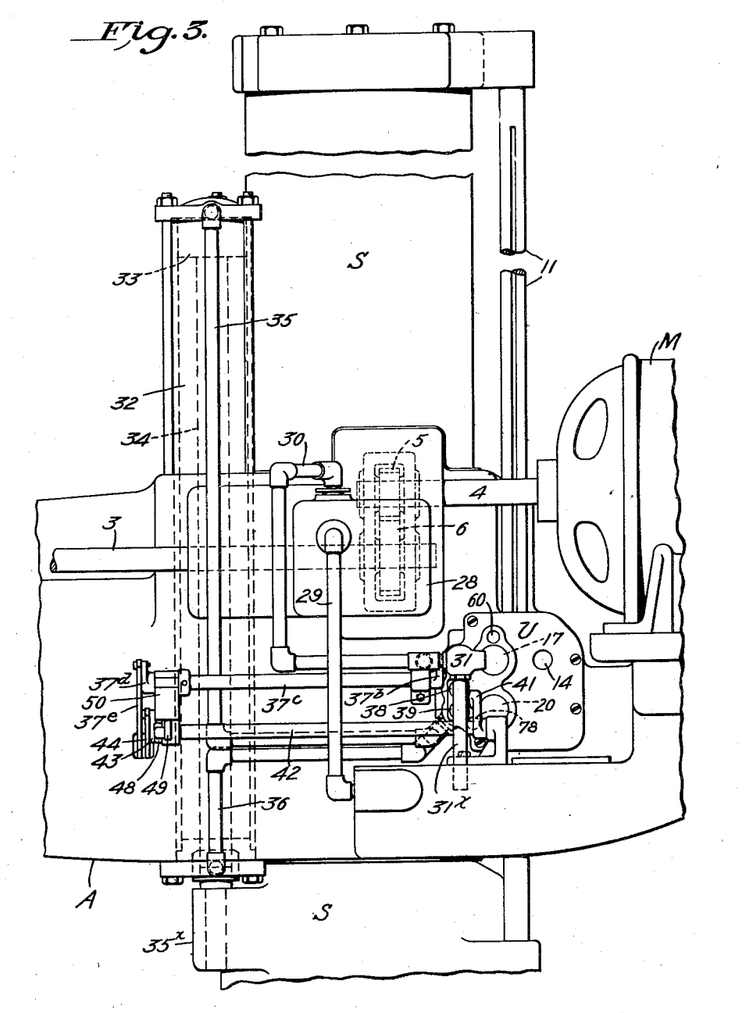
Fig. 3 is a rear view of a portion of the column and a portion of the arm supported thereon, showing particularly the connection between the arm shaft and its driving motor and portions of the hydraulic system for actuating the arm and column clamps and the arm translating hydraulic motor.

Referring more specifically to the drawings the invention is disclosed as embodied in a radial drill comprising a base B, a column rising vertically therefrom and consisting of a post P and a sleeve S rotatably journaled thereon. Translatably mounted on the sleeve is a radially disposed arm A having a rearwardly extending portion 1 on which is secured a driving motor M, and a forwardly extending portion 2 upon which is translatably mounted a tool head H, carrying a rotatable and translatable tool spindle T driven from the motor M by conventional driving connections including a shaft 3 extending along the arm and rearwardly thereof as shown in Fig. 3. The shaft 3 is driven from the motor shaft 4 by gears 5 and 6, as shown in Figs. 2 and 3. Inasmuch as the driving connection between the arm shaft and the tool spindle is conventional and forms no part of this invention illustration and description thereof is deemed unnecessary.

Means is provided for clamping the sleeve to the post in all of its angular positions of adjustment thereon. This means is shown most clearly in Fig. 2. The lower enlarged end of the sleeve is split horizontally and vertically as indicated at 7 thereby providing flexible portions 7ª and 7ᵇ. These portions are adapted to be constricted to cause them to grip the post therein. This may be effected either by power, as later will be described, or manually by means of a lever 8 fixed upon a bolt 9 extending through ears 7ᶜ and 7ᵈ on the sleeve and threaded into an eccentric strap 10 normally held against lateral movement.

The power means to actuate the column clamp comprises a shaft 11 journaled lengthwise of the sleeve and provided with an eccentric portion 12 within the strap 10 and which acts upon rotation of the shaft to shift the rod 9 axially and thereby effect clamping or unclamping of the sleeve. Power means for rotating the shaft 11 may comprise a pinion 13 splined thereon and carried by a unit U, in the nature of a sub-frame, secured in and movable vertically with the arm, as later will be described. The pinion 13 is engaged by the teeth 14ª of a rack-bar 14 slidably mounted in the unit U and adapted to be reciprocated in opposite directions to clamp and unclamp the sleeve. The reciprocating means for the rack-bar comprises a pinion 15 rotatably journaled on a stud 16 carried by the sub-frame U, which pinion engages, at one side, teeth 17ª formed in an hydraulically actuated piston 17 and at its opposite side teeth 14ᵇ formed on the rack-bar. Thus reciprocation of the piston 17 will alternately effect clamping and unclamping of the sleeve S.

To rigidly secure the arm to the column in all the vertical positions of the former, means is provided for clamping the arm to the sleeve. As shown most clearly in Fig. 2, the girdle G of the arm is split, as at g, and means is provided for contracting the girdle into clamping contact with the sleeve extending therethrough. This clamping means comprises clamp levers 18 and 19 fulcrumed, respectively, on pins 18ª and 19ª fitted into ears 18ᵇ, 19ᵇ at one side of the split g. Intermediate their ends the levers 18 and 19 are connected with draw bolts 18ᶜ and 19ᶜ which pass through ears 18ᵇ and 19ᵇ and through similar ears 18ᵈ and 19ᵈ at the opposite side of the split g and have nuts 18ᵉ and 19ᵉ threaded thereon. Thus outward movement of the inner ends of the levers 18 and 19 will cause the split girdle to be contracted into clamping contact with the sleeve. Fluid pressure actuated means is provided for actuating the clamp levers. This means comprises an hydraulically actuated piston 20 having rack teeth 20ª engaging a pinion 21 also rotatably journaled on the stud 16 above referred to. This pinion meshes with and drives a gear 22 journaled on a stud 23 supported by the sub-frame U. Gear 22 is fitted with an eccentric stud 24 surrounded by a roller 25, which latter bears against one end of a clamp actuating slide rod 26, the other end of which carries an equalizing head 27 engaging the free ends of the arm clamp levers 18 and 19. Thus alternate reciprocation of the piston 20 will effect clamping and unclamping of the arm.

As hereinbefore stated one of the primary objects of this invention is to provide hydraulically actuated means for translating the arm vertically on the column and for locking the arm in its various positions of adjustment. Fluid pressure for this purpose, and also for actuating the arm and column clamps is provided by a pump F (see Fig. 2) mounted in a housing 28 and driven from the motor M by having its gear f in engagement with the gear 6 on the arm shaft 3. The pump draws oil from the reservoir R, formed in the arm casting, through an intake conduit 29 and discharges it through a pipe 30 to certain valve means, later to be described, and eventually to the hydraulic motor for translating the arm and to the arm and column clamp actuating motors. The maximum pressure in the line 30 is determined by the setting of a relief valve 31 connected with the line 30 and having a discharge line 31ˣ extending back to the reservoir.

The improved hydraulically actuated means for effecting translation of the arm on the column preferably comprises a vertically arranged hydraulic motor comprising a cylinder 32 fixed to and movable with the arm A and a piston 33 fitted therein and rigidly connected, by a rod 34, with a portion of the column, preferably with a lug 35ˣ provided by the sleeve S. Fluid pressure, provided by the pump F, selectively may be admitted into the cylinder 32, above the piston 33, through a conduit 35, to effect upward movement of the cylinder and the arm connected therewith, or into the lower end of the cylinder, through a conduit 36 to effect downward movement of the cylinder and arm, by the selective actuation of valve means later to be described. Also by a suitable setting of said valve means both of the conduits 35 and 36 may be closed thereby hydraulically to lock the piston and cylinder against relative movement and to maintain the arm in its various positions of vertical adjustment.

The valves which control the flow of fluid to and from the arm translating motor, the column clamp motor, and the arm clamp motor are all embodied in the sub-frame U and are adapted selectively to be actuated by suitable levers carried by the tool head. The column clamp control valve is designated as 37 in Fig. 6 whereas the combined arm translating and arm clamp controlling valves are designated as 38 and 39. The valve 37 has a reduced portion 37ᵃ adapted to be engaged by a shifter arm 37ᵇ fixed upon one end of a shaft 37ᶜ journaled in bearings at the rear side of the arm. The other end of the shaft 37ᶜ has secured to it an arm 37ᵈ connected by a link 37ᵉ with an arm 37ᶠ secured upon a shaft 37ᵍ journaled lengthwise of the arm at the front thereof. A hand lever 37ʰ, carried by the tool head, has a splined connection with the shaft 37ᵍ and serves, in all positions of the head, as means for manually actuating the column clamp control valve 37.

The valves 38 and 39 are arranged in vertical alignment in the sub-frame U beneath the valve 37 and are tied together by a cross head 40. This cross head is connected to an actuating rock arm 41 secured upon one end of a rock shaft 42 journaled in bearings at the rear side of the arm and beneath the shaft 37ᶜ. To the other end of the shaft 42 there is secured an arm 43 connected by a link 44 with an arm 45 fixed upon one end of a shaft 46 journaled lengthwise of the arm A, beneath the shaft 37ᵍ. An actuating lever 47 carried by the tool head and having a splined connection with the shaft 46 serves as manual means, operable in all the positions of the tool head for shifting the valves 38 and 39.

Figures 4, 5:
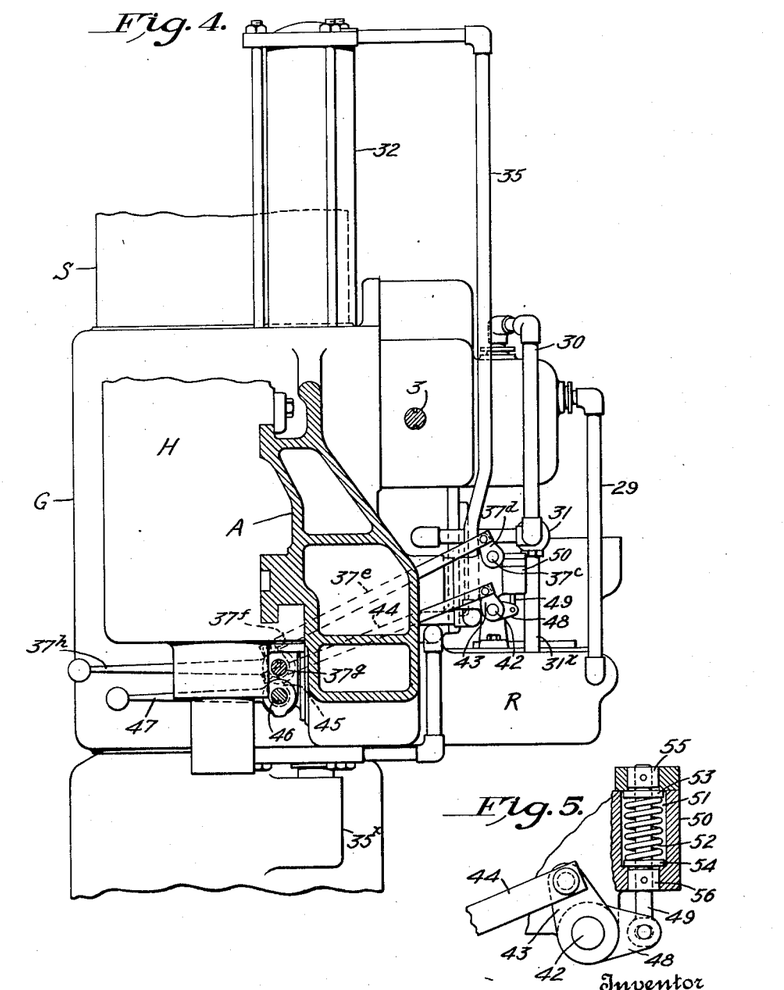
Fig. 4 is a vertical sectional view through the radial arm, looking toward the column.
Fig. 5 is a detail view showing the means for automatically returning the control lever to its intermediate position.

It is to be understood that the lever 47 is adapted to occupy any one of three positions to wit: (a) a central or intermediate position in which it so positions the valves 38 and 39 that the piston 33 and cylinder 32 are hydraulically locked against relative movement, (b) an upper position in which it so positions the valves as to unclamp the arm and admit fluid under pressure into the upper end of the cylinder thereby to effect upward translation of the arm, and (c) a lower position in which it positions the valves to unclamp the arm and admit fluid into the lower end of the cylinder to effect downward movement of the arm. Means is provided for automatically shifting the lever 47 to its intermediate position whenever the operator ceases positively to hold it in one of its other positions. This means is shown in Figs. 4 and 5 and comprises an arm 48 fixed to the shaft 42, which arm is connected to rod 49 slidingly mounted in a bracket 50 secured at the rear side of the arm. Within a chamber 51 formed in the bracket 50, and about the rod 49, is a coil spring 52 which engages, at its opposite ends, washers 53 and 54 loosely surrounding the rod 49 and adapted to bear against the inner end walls of the chamber 51. Collars 55 and 56, pinned to the rod 49 are adapted, upon opposite movements of the rod, by actuation of the lever 47, to engage washers 53 and 54 and compress the spring 52. When the lever is released the spring 52 acts to bring the parts, including the lever 47 and the valves 38 and 39 to their intermediate positions which thereby cause the arm to be hydraulically locked against vertical movement and clamped to sleeve S.

Figure 6:
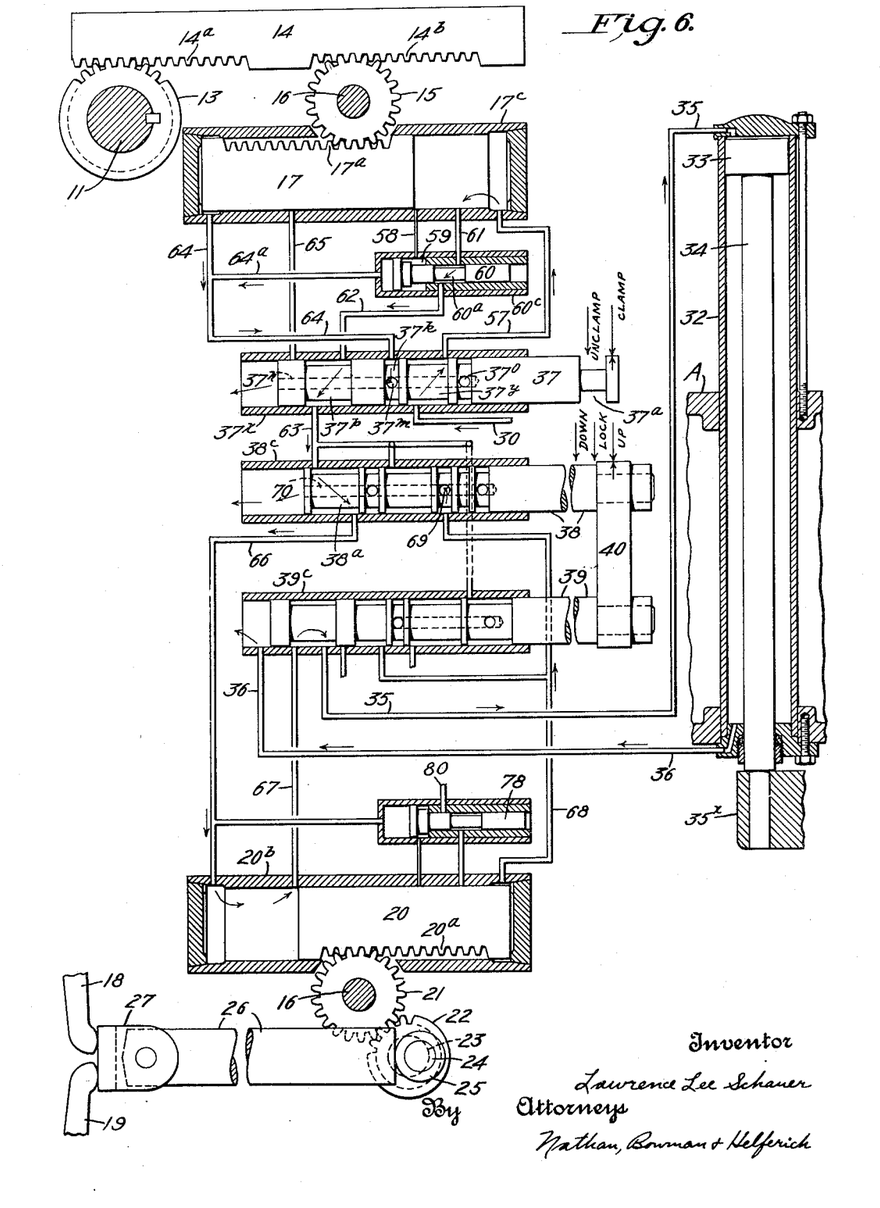
Fig. 6 is a diagrammatic development of the improved hydraulic system for translating the arm, for hydraulically locking the arm against vertical movement, for clamping the arm to the sleeve and for clamping the sleeve to the post, together with the control valves therefor and the elements actuated thereby, the valves being shown in the positions in which they effect clamping of the sleeve and unclamping and elevation of the arm.

Fig. 6 shows diagrammatically an hydraulic system which conveniently may be utilized in putting this invention into practice. In that figure the valve 37 is shown in a position in which it effects clamping of the sleeve to the post and the valves 38 and 39 are shown in the position in which they effect unclamping of the arm and upward translation thereof. It is to be understood that the valve 37 is shiftable independently of the valves 38 and 39 and, therefore, the sleeve may be either clamped or unclamped independently of the action of the arm clamp and arm translating means. The arm translating motor and the arm clamping motor are, however, interlocked through the valves 38 and 39 thereby insuring that the arm clamp will be opened before fluid will be transmitted to the translating motor and that the arm clamp will be set when translation of the arm is discontinued.

If desired, the sleeve clamping hydraulic circuit may be wholly independent of the arm translating and clamping circuit but for convenience they are shown in Fig. 6 as being combined. In that figure the flow of fluid is shown as flowing from the pump F through the conduit 30 into the casing 37ˣ of the valve 37, around the reduced cylindrical portion 37ʸ and thence through a conduit 57 into the right end of cylinder 17ᶜ in which the column clamp actuating piston 17 is fitted. Flow of fluid into the right end of the cylinder 17ᶜ forces the piston 17 to the left, thereby effecting clamping of the sleeve to the post. After the piston has been given its full movement fluid under pressure in the right end of cylinder 17ᶜ flows through port 58 connecting with a cylinder 59 in which is slidingly fitted a piston valve 60. Pressure in the cylinder 59 causes the valve 60 to be moved to the left to the position shown in Fig. 6, thereby permitting fluid in the intake end of the cylinder 17ᶜ to flow from that cylinder through a conduit 61 into the casing 60ᶜ of the valve 60, around the reduced portion 60ᵃ of the valve and through a conduit (or conduits) 62 into the casing of the valve 37 adjacent the reduced portion 37ᵖ thereof. From there it flows outwardly through a conduit 63 either to the valve 38 or 39, as later will be described.

As the piston 17 is moved to the left the fluid in the left end of the cylinder 17ᶜ is discharged through a conduit 64 into the casing 37ˣ of the valve 37 adjacent the reduced portion 37ᵏ thereof. From there it flows through a radial port 37ᵐ into an open ended axial bore 37ⁿ in the valve 37 from which it is discharged back into the reservoir R. Likewise fluid in the left end of the cylinder 59 is discharged through a conduit 64ᵃ into the conduit 64 and from there back to the reservoir as above described.

The valve 37 may be shifted to the left to cause the arrow on the valve stem to coincide with the arrow marked "unclamp" whereupon fluid under pressure will flow from the conduit 30 through the conduit 64 into the left end of the cylinder 17c and the fluid in the right end of the cylinder will be discharged through conduit 57 radial port 37o and axial bore 37n in the valve 37, and then back to the reservoir. When the piston 17 has been moved to its extreme right position to unclamp the column continued flow of fluid into the left end of the cylinder will flow outwardly therefrom through conduit 65 into the valves cylinder 37x, around the reduced portion 37p of the valve and thence outwardly through conduit 63. Thus it will be seen that in both settings of the valve 37 actuating fluid is delivered to the arm translating and clamping means by the conduit 63. Therefore, for an understanding of the control of the arm translating means and the arm clamping mechanism the column clamping means and the control therefor may be disregarded.

Fig. 6 shows the valves 38 and 39 in a position to effect unclamping of the arm and upward translation thereof. In this setting fluid from the conduit 63 enters the casing 38c of the valve 38, passes around the reduced portion 38a of the valve and thence through a conduit 66 into the left end of an hydraulic cylinder 20b which houses the arm clamp actuating piston 20. Fluid pressure in the left end of cylinder 20b causes the piston 20 to be pushed to the right to the position shown in Fig. 6, thereby causing the arm clamp to be released. From the cylinder 20b fluid flows through conduit 67 into the casing 39c of valve 39 and outwardly therefrom through conduit 35 into the upper end of the cylinder 32 thereby to effect upward translation of the arm, fluid beneath the piston 33 being discharged through conduit 36 into the casing of the valve 39 from whence it is discharged back into the reservoir. As the piston 20 moves to the right, fluid in the right end of the cylinder 20b is discharged through conduit 68 into the valve casing 38c from whence it flows through radial port 69 and axial bore 70 back to the reservoir.

Figure 7:
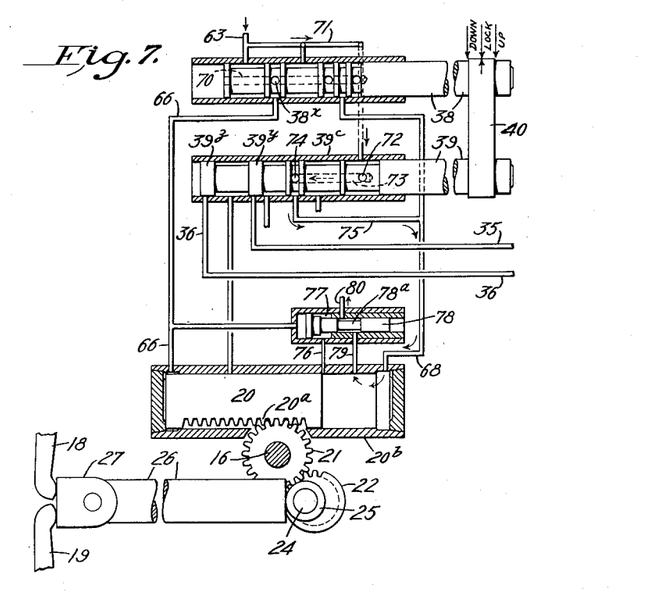
Fig. 7 is a diagrammatic view showing a portion of the hydraulic system and the valves which control the translation of the arm, the valves being shown in the position in which they cause the arm to be hydraulically locked against vertical movement as well as mechanically clamped to the column.

Fig. 7 shows the valves in the position to which they are moved when the operator releases the lever 47 and permits it to be moved to its intermediate position under the influence of the spring 52. In this setting translation of the arm is stopped and it is held in its position of vertical adjustment by reason of the fact that the conduits 35 and 36 are closed by the portions 39y and 39z respectively of the valve 39. This position of the valves also causes the arm clamp to be closed. This is effected by a flow of fluid under pressure from the conduit 63 through conduit 71 into the valve casing 39c, through radial port 72, axial bore 73, radial port 74 and conduit 75, into conduit 68 which at that time has its upper end closed by the valve 38 and its lower end connected with the right end of cylinder 20b. Flow into the right end of the cylinder 20b forces the piston 20 to the left thereby setting the arm clamp. When the piston 20 has been moved to the left sufficiently to clamp the arm fluid flows from cylinder 20b through port 76 into cylinder 77 containing piston valve 78. This causes the valve to be moved to the left and fluid entering the cylinder 20b flows through conduit 79 about the reduced portion 78a of the valve and thence through conduit 80 back to the reservoir. As the piston 20 is moved to the left fluid in the left end of the cylinder 20b is discharged through conduit 66, radial port 38x and axial bore 70 in the valve 38, back to the reservoir. From the foregoing it will be seen that after the arm clamp has been set the pump discharges back to the reservoir through a pressure free line.

Figure 8:
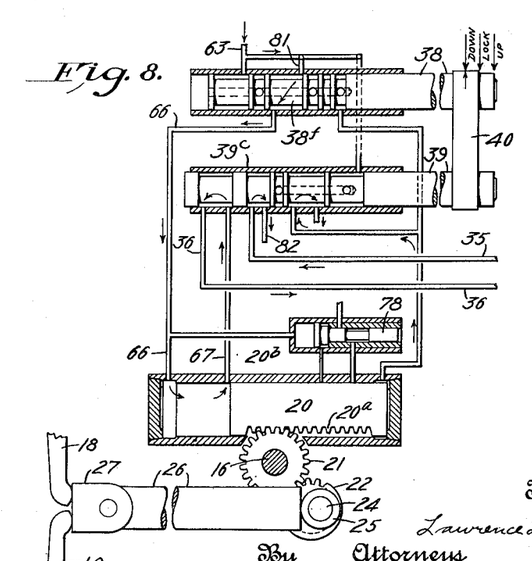
Fig. 8 is a similar view showing the valves in position to effect unclamping of the arm and downward translation thereof.

Fig. 8 shows the valves 38 and 39 shifted to their extreme left position indicated by the arrow marked "Down" in Fig. 6, this movement being effected by manually shifting the lever 47 to its lowermost position. In this position fluid from the conduit 63 flows through conduit 81, around the reduced portion 38f of the valve 38, through the conduits 66 and 67 into the valve casing 39c, thence outwardly through conduit 36 into the lower end of the cylinder 32 to effect downward movement of the arm. Fluid in the upper end of the cylinder is discharged through conduit 35 into the valve casing 39c and thence through conduit 82 back to the reservoir.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A radial drill combining a column; an arm translatably mounted thereon; a vertically arranged hydraulic motor comprising a cylinder and a piston, one of which is connected with the arm and the other of which is connected with the column; a reservoir in said arm; a power driven pump carried by said arm and adapted to draw fluid from said reservoir; conduits connecting the discharge port of said pump with the opposite ends of said cylinder; and manually controlled valve means for selectively directing the flow from said pump to either end of said cylinder thereby to effect translation of said arm in a predetermined direction.

2. A radial drill combining a column; an arm translatably mounted thereon; a reservoir in said arm; a tool head translatably mounted on said arm; a tool spindle rotatably journaled in said tool head; an electric motor mounted on said arm and adapted to rotate said spindle; an hydraulic motor connected to said column and arm for translating the latter; a pump carried by said arm and driven from said electric motor for drawing fluid from said reservoir; valve means carried by said arm; a conduit connecting the discharge port of said pump with said valve means; a plurality of conduits connecting said valve means with opposite ends of said hydraulic motor; and a manually actuable element carried by said tool head and connected to actuate said valve means, thereby to admit fluid into either end of said hydraulic motor.

3. A drilling machine combining a column; an arm translatably mounted thereon; a tool head translatably mounted on said arm; means including a hydraulic motor comprising a cylinder and a piston therein one of which is connected with the column and the other of which is connected with the arm, for translating the arm on said column; means to clamp the arm to the column in its adjusted positions; an hydraulic motor connected to actuate said arm clamp; a source of fluid pressure carried by said arm for actuating said motors; and a manually actuable element carried by said tool head for controlling the action of both of said hydraulic motors.

4. A drilling machine combining a column; an arm translatably mounted thereon; an hydraulic motor connected with said arm to effect translation thereof on said column; means to clamp the arm on said column in its adjusted positions; an hydraulic motor connected to actuate said arm clamp; a manually actuable element for controlling both of said hydraulic motors; and hydraulic means controlled by said element for insuring release of said arm clamp before said arm translating motor is rendered effective to shift said arm.

5. A drilling machine combining a column; an arm translatably mounted thereon; an hydraulic motor for translating said arm on said column; means to clamp said arm to said column; and hydraulic motor for actuating said arm clamp; a manually actuable member for controlling both of said motors; and means acting upon said member automatically to return it to a position in which it renders the translating motor ineffective to translate the arm and the clamp motor effective to clamp the arm to the column.

6. In a radial drill, a column; an arm translatably mounted on said column; an hydraulic motor connected with said column and said arm; a supply of fluid under pressure; conduits connecting said supply with said motor; valve means embodied in said conduits to control the flow of fluid to and from said motor; manual means to shift said valve to cause it to direct fluid through one of said conduits into one end of said motor and permit discharge through another conduit from the other end thereof, thereby to effect translation of said arms; and means acting upon discontinuance of the flow of fluid to close said intake and discharge conduits thereby hydraulically to lock said arm against translation.

7. In a radial drill, a support; a column rotatably journaled thereon; an arm translatably mounted on said column; means to clamp said column to said support; means to clamp said arm to said column; an hydraulic motor, comprising a relatively reciprocable cylinder and piston one of which is connected with said arm, to translate said arm on said column; an hydraulic motor connected to actuate each of said column and arm clamping means; a source of fluid pressure; conduits connecting said source with said three hydraulic motors; and valves embodied in said conduits for controlling said three motors, said valves and conduits serially connecting said column clamp motor, arm clamp motor and arm translating motor thereby requiring the column clamp to be completely set or completely released and the arm clamp to be completely released before the arm translating motor is actuated.

8. In a radial drill, a post; a sleeve thereon; means to clamp said sleeve to said post; an arm translatably mounted on said sleeve; a tool head on said arm; means to clamp said arm to the sleeve; an hydraulic motor operatively connected to actuate each of said clamping means; a reciprocating hydraulic motor connected to translate said arm on said sleeve; a fluid pressure line; conduits connecting said pressure line with said hydraulic motors; a plurality of valves directing the flow of fluid through said conduits, first to said sleeve clamping motor, then to said arm clamping motor and finally to said arm translating motor; and two actuating members carried by said tool head, operatively connected with said valves, one of said members being operative independently of the other to control said sleeve clamping motor, the other member being operative to control the arm clamping motor and the arm translating motor.

9. A drilling machine combining an upright column; an arm rotatably and translatably mounted thereon; hydraulic means including a reciprocatory hydraulic motor connected with said arm and column for translating said arm on said column; means to clamp the arm to the column; means for controlling the operation of said motor operable for closing both ends of said motor against in-flow or out-flow of fluid thereby hydraulically locking said arm against translation; and means coordinated with said last mentioned means for thereafter automatically actuating said arm clamp to clamp said arm to the column in the position determined by said hydraulic locking.

10. In a radial drill, an upright column; an arm translatably mounted thereon and rotatable about the axis of said column; a vertically arranged hydraulic cylinder movable vertically with said arm; a piston rod fixedly mounted against axial movement; a piston secured to said rod and fitted to said cylinder; means to admit liquid under pressure into said cylinder at one side of said piston to shift said cylinder relative to said piston, thereby to effect vertical translation of said arm on the column; clamping means for said arm; and means coordinated with said arm clamping means automatically rendered effective prior to the actuation of said clamping means to arm clamping position for stopping all flow of fluid to and from said cylinder whereby said arm is clamped when said arm is locked in a position of rest.

11. A drilling machine combining an upright column; a member translatably mounted thereon; a vertically arranged hydraulic motor comprising a cylinder and a piston, one of which is connected with the column and the other of which is connected with said member; a reservoir formed in the element to which the cylinder is connected; a power driven pump and rigid hydraulic conduits carried by said element and adapted to draw fluid from said reservoir and to inject it into one end of said cylinder, thereby to effect translation of said member and to cause fluid in the other end of said cylinder to be discharged back into said reservoir; manually controlled valves connected with the motor intake and motor discharge conduits for selectively connecting either end of said cylinder with said pump and simultaneously therewith connecting the other end of said cylinder with said reservoir; and means automatically effective to lock both ends of said cylinder against inflow and outflow of liquid when said valves are actuated to disconnect said cylinder from said pump.

LAWRENCE LEE SCHAUER.